Feb. 26, 1929.　　　　　　　　　　　　　　　　1,703,357
A. H. OSGOOD
HEAT CONTROLLING APPARATUS
Filed Feb. 20, 1926
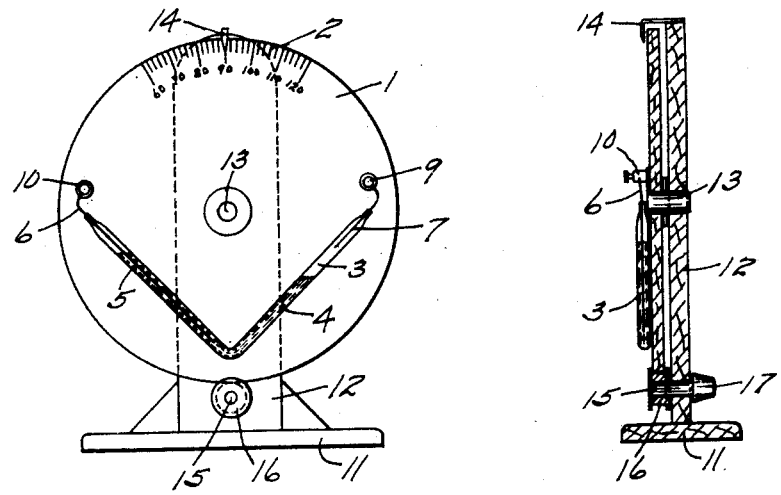
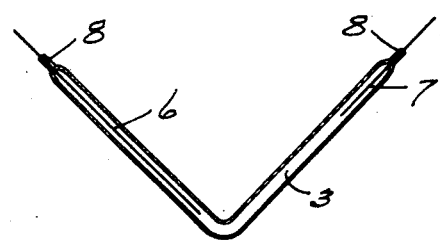
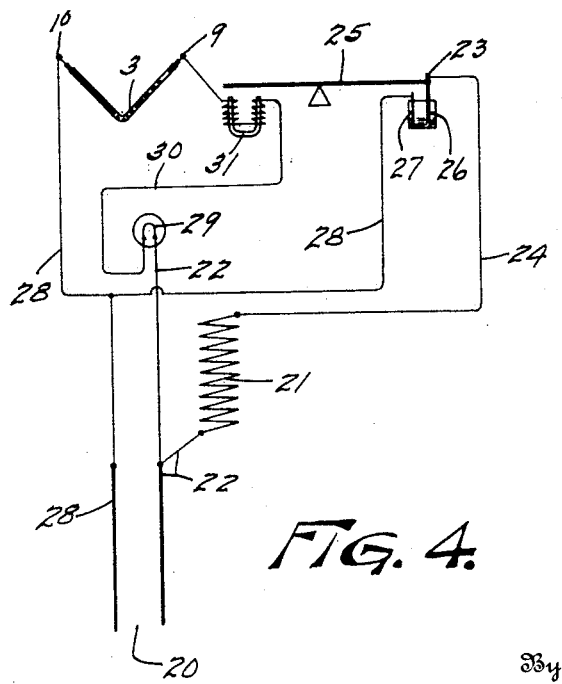
Inventor
Austin H. Osgood.
By Adam E. Fisher.
Attorney Patented Feb. 26, 1929.

1,703,357

UNITED STATES PATENT OFFICE.

AUSTIN H. OSGOOD, OF AUBURN, WASHINGTON.

HEAT-CONTROLLING APPARATUS.

Application filed February 20, 1926. Serial No. 89,573.

This invention relates to a heat controlling apparatus based upon the principle that an increased temperature of a liquid is accompanied by an increase in the vapor tension of the liquid. Two other physical forces cooperate with the increased vapor tension. These properties are: First, a gas or vapor expands when heated; and second, a liquid expands when heated.

The drawings and detailed description which follow shall not be construed to limit the inventor to the use of the particular materials mentioned nor to the specific type of construction described and illustrated. It shall be understood that the scope of the invention and the patent includes any and all use of a combination of the three properties: thermal vapor tension, thermal vapor expansion and thermal liquid expansion together in heat controlling or heat indicating devices.

The principal object of the invention is to provide a simple, reliable and accurate heat controlling apparatus. Accuracy is assured by the joint action of the three forces: thermal vapor tension, thermal expansion of vapor and thermal expansion of liquid.

Other objects will be apparent from the accompanying drawing and specification.

In the drawing:

Figure 1 is a plan view of a model of the invention, mounted on a panel disc.

Figure 2 is a section taken on the line 2—2 of Figure 1.

Figure 3 is a sectional detail of the thermostatic tube showing a method of securing the electrodes therein.

Figure 4 is a diagram of my invention as applied to an electric heat control apparatus.

A thermostatic control apparatus of the nature to be described would primarily be used for controlling the temperature of rooms, hot houses, incubators and other places where an even heat is desired. This thermostat could be mounted wherever desired and as far from the heating elements as desired for controlling the heat without interfering with the heating elements themselves. When used to control the heat from a furnace, the device can be used to operate electro-magnets or motors which would be used to open and close the draft and damper valves. However, for the purpose of illustration, the thermostat is shown in a diagrammatic layout in Figure 4 as applied in definite form for controlling the heat from an electric heater.

This model of the invention consists of a panel disc 1 which carries a temperature scale 2 which may be graduated into degrees of either Fahrenheit or centigrade measure. Mounted upon the panel disc 1 is a thermostatic tube 3 made of glass or other suitable material. The tube 3 is bent medially upon itself into the form of a V and is partially filled with mercury as shown at 4. A small amount of ether has been introduced which, together with its vapor, is shown to occupy the space above the mercury on one side of the tube as shown at 5. Electrodes 6 and 7 are then inserted into the upper extremities of the tube 3 and sealed therein as shown at 8 while their outer free ends are connected with terminals 9 and 10 which are mounted on the panel disc 1. The electrode 6 is relatively longer than the electrode 7 for a purpose to be later explained. The tube 3 is rigidly secured to the panel disc 1 and is in perfect alignment with the vertical and horizontal axis of said panel disc. A base 11 is integrally formed with a support 12 which is adapted to pivotally carry the panel disc 1 upon a shaft 13. An indicator 14 is secured to the support 12 and is adapted to engage the graduated face of the panel disc 1. A shaft 15 carrying a friction pulley 16 and a knob 17 is journaled in the support 12 and adapted to frictionally engage the circumference of the disc 1 to permit setting the disc for a given temperature.

In operation the panel disc 1 is turned until the marking on the panel disc 1 of the degree of temperature which it is desired to maintain is in line with the indicator 14. For example, if it is desired to maintain a temperature of 100° Fahr., the disc 1 would be turned until the 100° graduation mark is in line with the indicator 14; in that event the mercury will compress the vapor of the ether thereby leaving a considerable space between the end of the electrode 7 and the mercury. As the temperature rises, the ether vaporizes and forces the mercury toward the electrode 7 until a contact is made, thus closing the circuit in which the device is located. The electrode 6 reaches pretty well down toward the lower extremity of the tube 3 so that, as the ether vaporizes and expands, the mercury will still be forming a contact with the said electrode 6 when it also forms a contact with the electrode 7.

In Figure 4 my invention is shown in a definite form as used for controlling the heat from an electric heater. For the sake of distinction the various elements are consecutively numbered starting with the numeral 20.

As shown in Figure 4, an electric heating coil 21 has one of its terminals connected to the positive feed wire 22 of a standard circuit 20 while its other terminal is connected to an electrode 23 by a wire 24. The said electrode 23 is rigidly secured by its upper end to a pivotally mounted armature 25 while its lower end is adapted to enter a container 26 which contains a quantity of mercury. An electrode 27 is submerged in the mercury container 26 and is connected to the negative feed wire 28 of the line 20. A signal light 29 also has one of its terminals connected to the positive feed wire 22 while its other terminal is connected by a wire 30 to one of the terminals of an electro-magnet 31. The other terminal of the electro-magnet is connected with the terminals 9 of the thermostatic tube 3. The terminal 10 of the thermostatic tube 3 is connected with the negative feed wire 28.

The pivoted armature 25 is mounted in such a manner that the free end thereof extends over the electro-magnet 31. The end of the said armature 25 carrying the electrode 23 is heavier than the free end, thereby permitting the said electrode 23 to make a contact with the mercury in the container 26, thus closing the circuit of the heating coil 21. As the heat created by the said heating coil increases, the ether in the thermal tube 3 vaporizes and expands until the mercury in the said thermal tube 3 forms a contact with the electrode 7, thereby closing the circuit thru the signal light 29 and the electro-magnet 31.

In closing the circuit thru the electro-magnet 31 the armature 25 is attracted by the said electro-magnet 31, thereby breaking the contact formed by the electrode 23 with the mercury in the container 26, and opening the circuit of the heating coil 21. As soon as the temperature is reduced, the vaporized ether condenses itself into liquid form, thereby permitting the mercury in the tube 3 to recede and break the contact formed with the electrode 7, thus opening the circuit thru the electro-magnet and permitting the electrode 23 to close the circuit thru the heating coil 21.

While I have herein described a certain specific method of constructing and assembling the elements of my invention, it is understood that these details may be varied without departing from the spirit of my invention as defined in the appended claims.

I claim:

In a thermostatic electric circuit control, a fluid containing closed tube, said tube being bent right-angularly between its ends; fixed contacts sealed in the ends of said tube and adapted to extend thereinto from opposite ends, one contact extending a greater distance into said tube than the other; an electrically conducting fluid positioned in said tube; a volatile fluid positioned in said tube between said electrically conducting fluid and that end of said tube having the longer contact sealed therein; and means varying the hydrostatic head of said conducting fluid upon said volatile fluid for imparting an initial pressure on the vapor forming face of said volatile fluid.

In testimony whereof I affix my signature.

AUSTIN H. OSGOOD.